United States Patent
Burkle

(10) Patent No.: US 12,109,624 B2
(45) Date of Patent: Oct. 8, 2024

(54) EXTERNAL AND INTERNAL TURNING TOOL WITH COOLANT

(71) Applicant: WALTER AG, Tubingen (DE)

(72) Inventor: Hubert Burkle, Ammerbuch (DE)

(73) Assignee: WALTER AG, Tubingen (DE)

( * ) Notice: Subject to any disclaimer, the term of this patent is extended or adjusted under 35 U.S.C. 154(b) by 44 days.

(21) Appl. No.: 17/275,024

(22) PCT Filed: Aug. 20, 2019

(86) PCT No.: PCT/EP2019/072205
§ 371 (c)(1),
(2) Date: Mar. 10, 2021

(87) PCT Pub. No.: WO2020/052918
PCT Pub. Date: Mar. 19, 2020

(65) Prior Publication Data
US 2022/0063001 A1    Mar. 3, 2022

(30) Foreign Application Priority Data
Sep. 11, 2018 (EP) ...................................... 18193795

(51) Int. Cl.
*B23B 27/10* (2006.01)

(52) U.S. Cl.
CPC .......... *B23B 27/10* (2013.01); *B23B 2250/12* (2013.01)

(58) Field of Classification Search
CPC ..... B23B 28/10; B23B 2250/12; B23B 27/10; B23Q 11/10; B23Q 11/1076; B23Q 11/1023
See application file for complete search history.

(56) References Cited

U.S. PATENT DOCUMENTS

| | | | | |
|---|---|---|---|---|
| 5,272,945 A | * | 12/1993 | Lockard | B23B 29/043 82/160 |
| 5,340,242 A | * | 8/1994 | Armbrust | B23B 25/02 407/4 |
| 2010/0196105 A1 | | 8/2010 | Amstibovitsky et al. | |
| 2014/0270999 A1 | * | 9/2014 | Huang | B23B 27/10 407/11 |

(Continued)

FOREIGN PATENT DOCUMENTS

| | | |
|---|---|---|
| CN | 101541455 A | 9/2009 |
| CN | 102672213 A | 9/2012 |
| DE | 202013104099 U1 * | 11/2013 ............ B23B 29/04 |

(Continued)

*Primary Examiner* — Ryan Rufo
(74) *Attorney, Agent, or Firm* — Corinne R. Gorski

(57) ABSTRACT

A turning tool includes a tool body having an insert seat that accommodates a cutting insert and a mounting means for mounting the cutting insert at the tool body. A guiding block is movably mounted between a first position and a second position at the tool body. A fluid passage is arranged to eject a jet of cooling fluid from an inlet end to at least one outlet onto a clearance surface associated with a cutting edge of the cutting insert. When the guiding block is in the first position the jet of cooling fluid is ejected along a first line and when the guiding block is in the second position the jet of cooling fluid is ejected along a second line, wherein the first line and the second line have different orientations and intersect each other at a position in a downstream direction from the outlet.

15 Claims, 6 Drawing Sheets

(56) References Cited

U.S. PATENT DOCUMENTS

2021/0308773 A1\* 10/2021 Senzenberger .... B23Q 11/1076

FOREIGN PATENT DOCUMENTS

| DE | 102016101422 A1 | | 7/2017 | |
|---|---|---|---|---|
| DE | 102018113213 A1 | \* | 12/2018 | ............ B23B 27/10 |
| EP | 1522382 A1 | \* | 4/2005 | ........ B23Q 11/1076 |
| EP | 3059034 A1 | | 8/2016 | |
| EP | 3135410 A1 | \* | 3/2017 | ............ B23B 27/10 |
| JP | S58177204 U | | 11/1983 | |
| JP | H0825110 A | | 1/1996 | |
| JP | H0825111 A | | 1/1996 | |
| JP | H08257807 A | | 10/1996 | |
| JP | 2009125848 A | | 6/2009 | |
| JP | 2014028417 A | \* | 2/2014 | |
| KR | 2005107540 A | \* | 11/2005 | ............ B23B 27/10 |
| WO | WO-2006077363 A1 | \* | 7/2006 | ............ B23B 27/10 |
| WO | WO-2015056496 A1 | \* | 4/2015 | ............ B23B 27/10 |
| WO | 2017003343 A1 | | 1/2017 | |

\* cited by examiner

EXTERNAL AND INTERNAL TURNING TOOL WITH COOLANT

RELATED APPLICATION DATA

This application is a § 371 National Stage Application of PCT International Application No. PCT/EP2019/072205 filed Aug. 20, 2019 claiming priority to EP 18193795.4 filed Sep. 11, 2018.

TECHNICAL FIELD

The present disclosure relates to a turning tool comprising a tool body having an insert seat for accommodating a cutting insert, which has a cutting edge and a therewith associated clearance surface, a guiding block movably mounted between a first position and a second position at the tool body, and a fluid passage with an inlet end and at least one outlet which is arranged to guide a cooling fluid from the inlet end to the at least one outlet, wherein the at least one outlet is arranged to eject a jet of the cooling fluid towards an area where the clearance surface is located when the cutting insert is accommodated on the insert seat, wherein a first section of the fluid passage extends through the tool body, wherein a second section of the fluid passage extends through the guiding block, and wherein the at least one outlet forms an end of the second section of the fluid passage in the guiding block.

BACKGROUND

Turning tools with a tool body and a cutting insert mounted in an insert seat of the tool body are used for turning of a workpiece. During tuning, the workpiece is rotated while a cutting edge of a cutting insert is in engagement with a surface of the workpiece and during rotation of the workpiece the turning tool is fed radially inwardly with respect to the axis of rotation of the workpiece.

Machining of a workpiece by turning can be used to machine an outer surface of the workpiece, like a cylindrical surface (external turning) or an inner surface of the workpiece, like a hole or a threading in the workpiece (internal turning).

Different turning tools are known which are applied either for external turning or for internal turning. For external turning tools, an optimized cooling strategy, including a cooling of the clearance surface, has been developed. However, those turning tools used for external turning typically cannot be used for internal turning due to the footprint restrictions for the turning tool when used for operation in a recess of the workpiece.

US 2010/0196105 A1 discloses a turning tool with a coolant conveying member, to provide coolant fluid to a chip surface of a cutting insert during a cutting operation. The cooling conveying member includes a member body having a fluid passage formed therein, and a nozzle to convey and to jet out the coolant fluid there through. The nozzle is shiftable relative through the member body between a first extended position and a second retracted position. In the extended position, for example, assumed during the cutting operation, the nozzle extends out and forwardly from the member body and above the chip surface. In the retracted position, for example, assumed when the coolant fluid does not flow through the coolant conveying member, the nozzle may be at least partially accommodated in the fluid passage, to allow, for example, indexing or replacing of the cutting insert.

SUMMARY

It is thus an aspect of the present disclosure to provide a turning tool allowing an optimized cooling of a clearance surface of the cutting insert during an external turning operation while at the same time allowing internal turning with the same turning tool.

According to the present disclosure this aspect is addressed by a turning tool comprising a tool body having an insert seat for accommodating a cutting insert, which has a cutting edge and a therewith associated clearance surface, a guiding block movably mounted between a first position and a second position at the tool body, and a fluid passage with an inlet end and at least one outlet, which is arranged to guide a cooling fluid from the inlet end to the at least one outlet, wherein the at least one outlet is arranged to eject a jet of the cooling fluid towards an area where the clearance surface is located when the cutting insert is accommodated on the insert seat, wherein a first section of the fluid passage extends through the tool body, wherein a second section of the fluid passage extends through the guiding block, and wherein at least one outlet forms an end of the second section of the fluid passage in the guiding block, wherein at least the tool body or the guiding block is arranged such that when the guiding block is in the first position the jet of cooling fluid is ejected along a first line and such that when the guiding block is in the second position the jet of cooling fluid is ejected along a second line, wherein the first line and the second line have different orientations and intersect each other at a position in a downstream direction from the outlet.

It has turned out that an optimum cooling of a cutting edge or a cutting corner of a cutting insert mounted on a tool body of a turning tool is achieved once the jet of cooling fluid wets the clearance surface of the active cutting edge or cutting corner to the largest possible extent. During external turning, due to the convex surface of the workpiece to be turned, there is hardly any footprint restriction with respect to the turning tool. Consequently, during external turning a part of the turning tool carrying an outlet of the fluid passage, e.g., the guiding block according to the present disclosure, may protrude from the tool body in order to provide an optimum angle between the jet of cooling fluid and the clearance surface of the insert to be cooled.

However, when using the same turning tool for internal turning this protruding part at the tool body would interfere with the surface to be turned by the turning tool. According to the present disclosure this is addressed by a guiding block carrying at least one outlet of the fluid passage for the cooling fluid being movably mounted at the tool body.

When the guiding block is moved such that it no longer interferes with a surface to be turned during internal turning the jet of cooling fluid ejected onto the clearance surface must have a different orientation while still wetting at least section of the clearance surface of the insert to be cooled. The first line describing the jet of cooling fluid when the guiding block is in its first position and the second line describing the jet of cooling fluid when the guiding block is in its second position intersect somewhere on the clearance surface of the insert, i.e., downstream from the respective outlet or outlets.

In an embodiment, the guiding block is manufactured of the same material as the tool body, e.g., from tool steel. In an embodiment, the cutting insert is manufactured of a cemented carbide.

In an embodiment of the present disclosure, the guiding block is mounted at the tool body such that it can translationally be moved with respect to the tool body. In a further embodiment of the present disclosure, the guiding block is pivotably mounted at the tool body. In yet another embodiment, the guiding block is mounted at the tool body such that a combination of a pivoting and a linear motion between the guiding block and the tool body may be provided.

In an embodiment, wherein either the guiding block is mounted on the tool body to provide a translational motion with respect to the tool body or the guiding block is pivotably mounted at the tool body, the fluid passage comprises at least two outlets.

In an embodiment, the fluid passage has exactly two outlets or at least two outlets. At least one of the two outlets forms an end of the second section of the fluid passage in the guiding block, wherein the other outlet may alternatively form an end of a section of the fluid passage in the tool body or in the guiding block.

In an embodiment, the turning tool comprises a transfer element arranged to transfer cooling fluid from the first section of the fluid passage in the tool body to at least the second section of the fluid passage in the guiding block.

In an embodiment, wherein the guiding block is pivotably mounted at the tool body, the transfer element extends from an outer surface of the tool body into a hole in the guiding block, wherein the transfer element comprises a cylindrical outer surface in engagement with an inner cylindrical surface of the hole in the guiding block. In this embodiment, the transfer element comprises an inner axial fluid duct in fluid communication with the first section of the fluid passage in the tool body. Either the transfer element comprises a circumferentially extending first groove in its cylindrical outer surface, or the guiding block comprises a circumferentially extending first groove in the inner cylindrical surface, wherein the first groove is located at a first axial position. Further, the transfer element comprises a first radial fluid duct connecting the inner axial fluid duct and the first groove. Finally, the second section of the fluid passage in the guiding block discharges into the cylindrical hole at the first axial position. By this design, a fluid communication of cooling fluid between the first section of the fluid passage in the tool body and the second section of the fluid passage in the guiding block is provided while still enabling a pivoting of the guiding block.

Alternatively, the transfer element with its cylindrical outer surface extends from an outer surface of the guiding block and is in engagement with a cylindrical inner surface of a hole in the guiding body. In this embodiment, the transfer element comprises an inner axial fluid duct in fluid communication with the second section of the fluid passage in the guiding block. Either the transfer element comprises a circumferentially extending first groove in its cylindrical outer surface, or the tool body 20) comprises a circumferentially extending first groove in the inner cylindrical surface, wherein the first groove is located at a first axial position. Further, the transfer element comprises a first radial fluid duct connecting the inner axial fluid duct and the first groove. Finally, the first section of the fluid passage in the tool body discharges into the cylindrical hole at the first axial position. Also, by this design, a fluid communication of cooling fluid between the first section of the fluid passage in the tool body and the second section of the fluid passage in the guiding block is provided while still enabling a pivoting of the guiding block.

In an embodiment, wherein at least two outlets of the fluid passage are arranged in the guiding block a third section of the fluid passage extends through the guiding block, wherein the first outlet forms an end of the second section of the fluid passage in the guiding block, and wherein a second outlet forms an end of the third section of the fluid passage in the guiding block. It is apparent that when the guiding block comprises two outlets of the fluid passage these two outlets have different orientations on the guiding block in order to ensure that in the first position of the guiding block the cooling fluid is ejected along the first line and in the second position of the guiding block the coolant fluid is ejected along the second line.

In an embodiment, wherein more than two outlets are located in the guiding block, the transfer element in an embodiment is designed in order to transfer cooling liquid to each of the sections of the fluid passage connecting to the outlets.

Alternatively, in an embodiment, wherein the second outlet is arranged in the tool body, the first and the second outlets must have different orientations, when compared with the guiding block in its first position.

In an embodiment, wherein the first and second outlet are located in the guiding block, the first outlet is located in a first outer surface section of the guiding block and the second outlet is located in a second outer surface section of the guiding block, wherein a direction of a surface normal of the first outer surface section is different from a direction of a surface normal of the second outer surface section. In a further embodiment, the first and the second outer surface sections are planar surface sections extending under an angle with respect to each other, wherein the second section of the fluid passage and the third section of the fluid passage extend perpendicular to the first and second outer surface sections of the guiding block.

In an embodiment comprising at least a first outlet and a second outlet of the fluid passage in the guiding block, the transfer element may be arranged to selectively transfer the cooling fluid either from the first section of the fluid passage in the tool body to the second section of the fluid passage in the guiding block or from the first section of the fluid passage in the tool body to a third section of the fluid passage, wherein the second outlet forms an end of the third section of the fluid passage. In this embodiment, the transfer element provides a switching function to selectively connect either the second section or the third section of the fluid passage to the first section of the fluid passage.

While in principle it would be possible to eject cooling fluid through at least two outlets simultaneously, it is more efficient once the respective outlet which during operation of the turning tool is not oriented under the optimized angle is disconnected.

In an embodiment, wherein more than two outlets are located in the guiding block, the transfer element in an embodiment may be designed in order to selectively transfer cooling liquid to a single one out of the plurality of outlets depending on the position of the guiding block relative to the tool body.

In an embodiment, wherein the second section of the fluid passage with the first outlet as well as the third section of the fluid passage with the second outlet are located in the guiding block, the transfer element comprises a circumferentially extending second groove in the cylindrical outer surface and the guiding block comprises a circumferentially extending second groove in the inner cylindrical surface, wherein the second groove is located at a second axial position. In this embodiment, the transfer element further comprises a second radial fluid duct connecting the inner axial fluid duct and the second groove. Finally, the third section of the fluid passage in the guiding block outlets in the cylindrical hole at the second axial position.

By this arrangement, the second and the third section of the fluid passage are connected to the first section in the tool body.

Alternatively, the same functionality can of course be provided in a design, wherein the transfer element with its cylindrical outer surface extends from an outer surface of the guiding block and is in engagement with a cylindrical inner surface of a hole in the tool body.

In an embodiment, wherein the guiding block is pivotably mounted at the tool body and wherein the transfer element has a cylindrical structure, the first groove and the second groove each have a circumferential extension of less than 360°. In this embodiment, the first groove and the second groove are circumferentially arranged such that at least when the guiding block is in the first position the second section of the fluid passage is in fluid communication with the first section of the fluid passage and the third section of the fluid passage is not in fluid communication with the first section of the fluid passage, and such that at least when the guiding block is in the second position the third section of the fluid passage is in fluid communication with the first section of the fluid passage and the second section of the fluid passage is not in fluid communication with the first section of the fluid passage.

By this arrangement, a transfer element is provided which selectively and alternatingly transfers the cooling fluid either from the first section of the fluid passage in the tool body to the second section of the fluid passage in the guiding block or from the first section of the fluid passage in the tool body to the third section of the fluid passage in the guiding block.

In a further embodiment of the present disclosure, in the first position of the guiding block an abutment surface of the guiding block is in engagement with a first stop surface of the tool body, wherein in the second position of the guiding block an abutment surface of the guiding block is in engagement with a second stop surface of the tool body. In a further embodiment, the guiding block has a first and a second abutment surface, wherein the first abutment surface is in engagement with the first stop surface in the first position and the second abutment surface is in engagement with the second stop surface in the second position of the guiding block.

In yet another embodiment of the present disclosure, the insert seat has a bottom surface with a surface normal, wherein the at least one outlet is distanced from the bottom surface in a direction opposite to a direction of the surface normal. Expressed in other words, the at least one outlet is located below the insert seat.

In another embodiment, the turning tool further comprises a cutting insert having a cutting edge and a clearance surface associated therewith, which cutting insert is mounted on the insert seat. In a further embodiment, the cutting edge comprises a cutting corner. In yet another embodiment the cutting insert is an indexable insert.

The cutting insert is mounted on the insert seat by use of the mounting means. The mounting means in principle could be any means suitable to fasten the insert at the tool body. Examples for mounting means in the sense of the present disclosures are a clamping means or a screw.

The general concept of the present disclosure can well be understood with respect to an embodiment, wherein a cutting insert is mounted on the insert seat.

In an embodiment, the cutting insert has a bottom surface and a top surface, wherein a side surface connects the bottom surface and the top surface. At least an intersection between the side surface and the top surface of the insert forms the cutting edge. In an embodiment, this cutting insert is mounted on the insert seat with the bottom surface of the insert being in engagement with the bottom support surface of the insert seat. In this embodiment, the sides surface of the cutting insert forms the clearance surface and the top surface forms a chip surface.

An optimized cooling of the clearance surface of the cutting insert may be achieved when the jet of cooling fluid streaks the clearance surface along its entire extension from the bottom surface to the top surface of the cutting insert. In an embodiment, wherein the turning tool with a cutting insert is intended to cut the workpiece with the cutting corner, an area between two side surfaces of the insert forms at least part of the clearance surface and for an optimized cooling this corner shall be streaked by the jet of cooling fluid.

However, in order to allow the jet of cooling fluid to streak at least most of the extension of the clearance surface between the bottom surface and the top surface of the cutting insert, the outlet of the fluid passage must be located below the bottom surface of the insert. When the outlet is in this position the guiding block will prohibit turning of an inner surface with the same tool as the guiding block would come into engagement and interfere with the inner surface of the workpiece to be worked.

Consequently, according to the present disclosure, the guiding block is moved into the second position, wherein in the second position the guiding block is distanced from an imaginary circle describing the minimum diameter an inner surface turnable by the turning tool may have and being in engagement with the cutting edge or cutting corner. Still, in this second position, the jet of cooling fluid must spray onto the clearance surface of the insert. However, the jet of cooling fluid in the second position of the guiding block will no longer streak the entire clearance surface in its extension from the bottom surface to the upper surface of the cutting insert below the active part of the cutting edge. Consequently, in an embodiment of the present disclosure, the first line and the second line along which the jet of cooling fluid propagates when the guiding block is either in the first position or in the second position intersect each other at a position on the clearance surface of the cutting insert.

At least one of the above aspects is also addressed by use of a turning tool according to an embodiment of the present disclosure as it has been described above for turning of an inner surface, wherein the guiding block is in the second position.

In a further embodiment of the present disclosure, the turning tool in addition to the fluid passage for cooling the clearance surface of the insert comprises a cooling duct for ejection of a cooling fluid onto a chip surface associated with the cutting edge of the cutting insert.

In an embodiment, the cooling duct for cooling the chip surface is placed in a clamping means for clamping a cutting insert on the insert seat, wherein the clamping means is a mounting means in the sense of the present disclosure.

When a cutting insert is accommodated on the insert seat and the cutting insert is clamped onto the insert seat by use of a clamping means, in an embodiment, a jet of cooling fluid ejected from the cooling duct hits the cutting insert on its top surface forming the chip surface during the turning operation.

BRIEF DESCRIPTION OF THE FIGURES

Further advantages, features and applications of the present disclosure will become apparent from the following description of embodiments and the corresponding figures attached. The foregoing, as well as the following detailed description of implementations of the present disclosure, will be better understood when read in conjunction with the appended drawings. It should be understood that the implementations depicted are not limited to the precise arrangements and instrumentalities shown.

DETAILED DESCRIPTION

Figure 1:
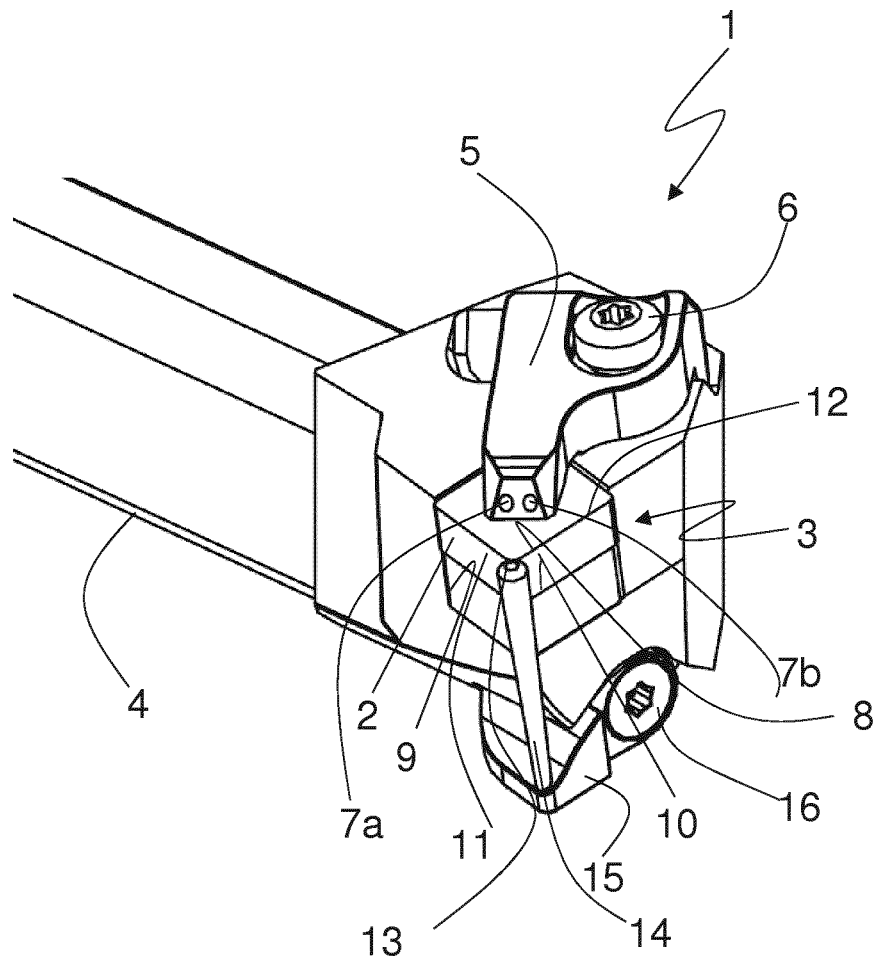
FIG. 1 is a broken away isometric view of an implementation of a turning tool according to the present disclosure with the guiding block in the first position.

In the figures, identical elements are denoted by identical reference numbers.

FIGS. 1 to 6 show an implementation of a turning tool 1 according to the present disclosure. The turning tool 1 allows an optimized cooling of a cutting insert 2 during external turning, as well as, during internal turning. The basic body of the turning tool 1 is formed by the tool body 4 carrying the insert seat 3 to accommodate the cutting insert 2. In order to mount the cutting insert 2 in the insert seat 3 of the tool body 4, the turning tool 1 further has a clamp 5, which is screwed onto the tool body 4 by a mounting screw 6 reaching through a hole in the clamp 5 and engaging into a threaded hole in the tool body 4. In addition to the actual clamping functionality, the clamp 5 comprises a cooling duct having two outlets 7a, 7b to eject a jet of cooling fluid from the clamp 5 onto the chip surface 8 of the cutting insert 2.

The cutting insert 2 in the implementation shown, has a rhombic basic area with a rhombic top surface 8, a rhombic bottom surface in engagement with a bottom supporting surface of the insert seat 3, as well as, four side surfaces 9, 10. Cutting edges 11, 12 are formed where the side surfaces 9, 10 intersect with the top surface 8 of the cutting insert 2.

In the present implementation, the cutting insert is mounted in order to provide the cutting operation predominantly by the cutting corner formed where the two cutting edges 11, 12 intersect.

In order to enhance the cooling of the cutting insert 2, in addition to the cooling ducts in the clamp 5, an efficient cooling of the clearance surface formed by the side surfaces 9, 10 of the cutting insert 2 is provided. As a major part of the cutting performance is carried out by the cutting corner 13 of the cutting insert 2, a most efficient cooling on the clearance surface is provided if a jet of cooling fluid 14 during the cutting operation streaks along the edge connecting the two side surfaces 9, 10 and being associated with the cutting corner 13.

Figure 2:
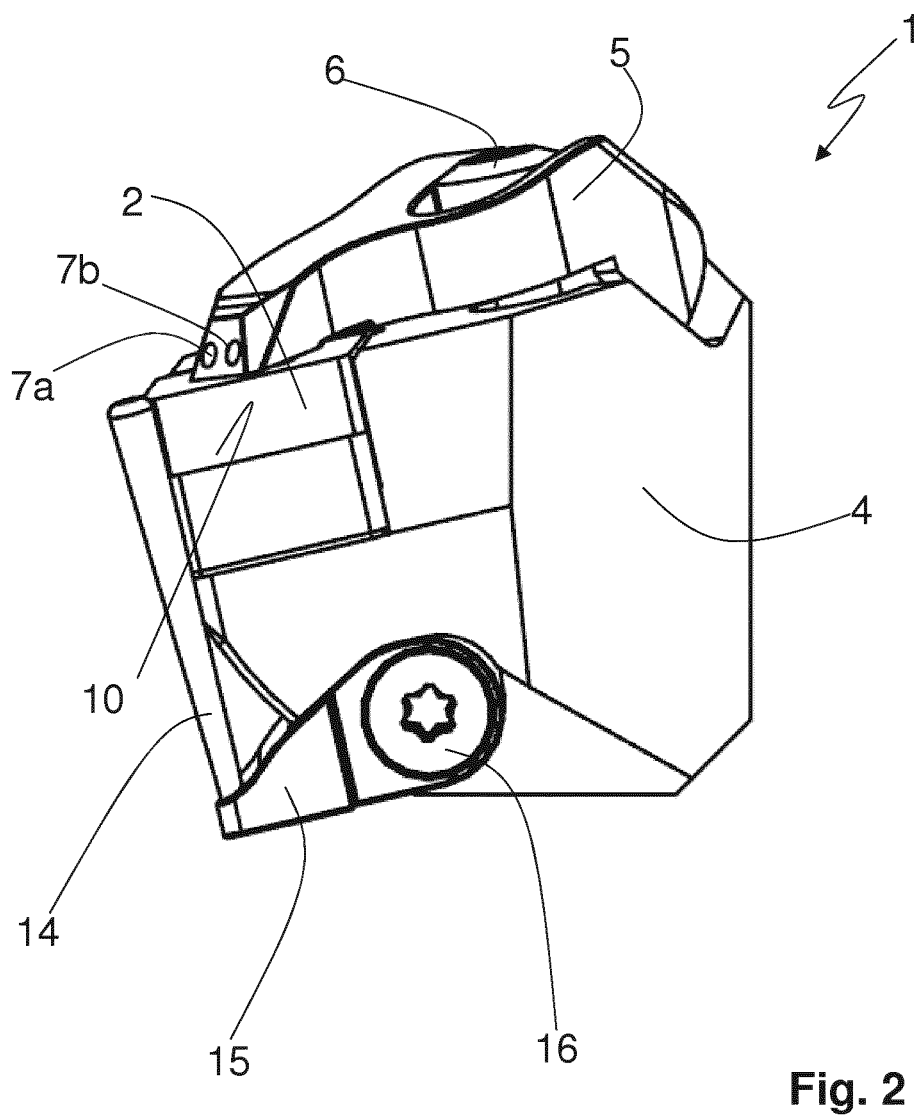
FIG. 2 is a front view of the turning tool of FIG. 1 with the guiding tool in the first position.

In order to provide a jet 14 of cooling fluid, which streaks along the clearance surface associated with the cutting corner 13, the jet 14 of cooling liquid is ejected from a nozzle at a position directly below the cutting corner 13 as it is depicted in FIGS. 1 and 2.

Figure 3:
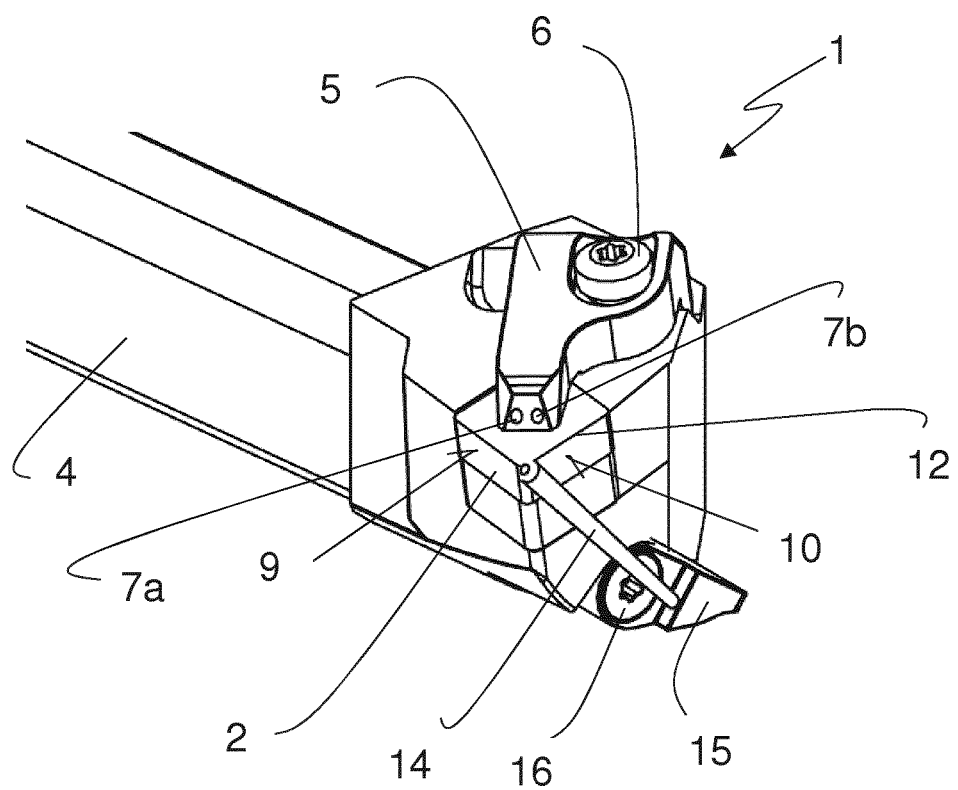
FIG. 3 is a broken away isometric view of the turning tool of FIGS. 1 and 2 with the guiding block in the second position.

The turning tool 1 has a guiding block 15, which is pivotably mounted on the tool body 4 around a pivoting axis, which is defined by a transfer element/screw 16. The position of the guiding block 15, depicted in FIGS. 1 and 2, is denoted the first position in the sense of the present disclosure and the position of the guiding block 15 depicted in FIGS. 3 and 4 is denoted the second position in the sense of the present disclosure.

Figure 4:
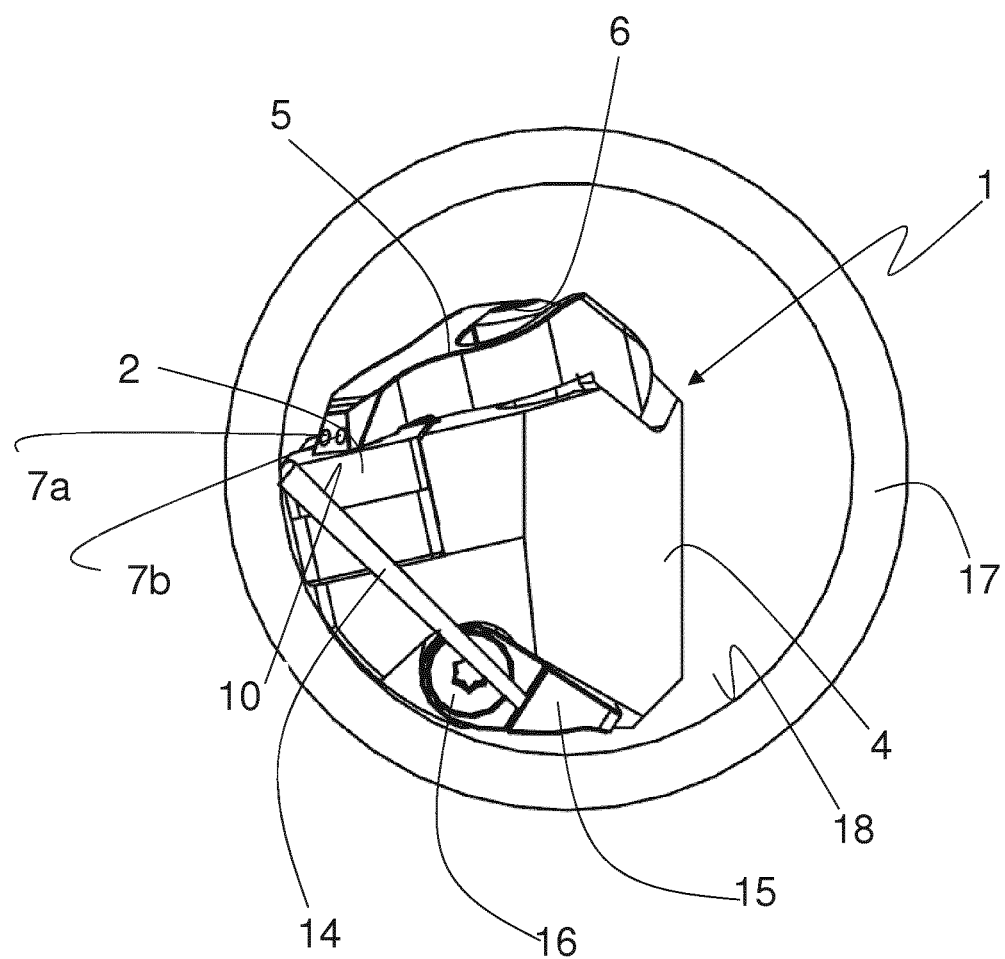
FIG. 4 is a front view of the turning tool of FIGS. 1 to 3, during turning of an inner surface of a workpiece with the guiding block in the second position.

While providing an optimized geometry for the jet 14 of cooling fluid towards the side surface 9, 10, it is readily apparent in particular from FIGS. 2 and 4 that the guiding block 15, when it is in the first position, would interfere with the material of a workpiece when using the turning tool 1 for internal turning. The situation occurring during internal turning is depicted in FIG. 4. While FIG. 4 shows a front view of the turning tool 1, the turning tool 1 is depicted in an isometric view from above in FIG. 2.

In the second position, the guiding block 15 is located within and distanced from an imaginary circle, which is in engagement with the active cutting corner of a cutting insert 2 and which defines the minimum radius an inner surface may have for internal turning with the turning tool 1, according to the present disclosure. This situation is depicted in FIG. 4, wherein the imaginary circle is provided an inner surface 18 of a tubular workpiece 17 to be internally turned. Due to the pivoting of the guiding block 15 into the second position, the guiding block 15 does not interfere with the tubular workpiece 17 and internal turning of the inner surface 18 of the tubular workpiece 17 can be performed.

Still, the guiding block 15 provides an efficient cooling of the clearance surface 9, 10, although the jet 14 of cooling liquid no longer streaks along the entire clearance surface connecting the upper cutting corner and the lower surface of the cutting insert 2.

By a comparison of FIGS. 1 and 2 on the one hand, and FIGS. 3 and 4 on the other hand, the general concept of the present disclosure can be explained. For an efficient cooling of the clearance surface formed by the side surfaces 9, 10, the jet of cooling liquid 14 must hit the side surfaces 9, 10 in either position of the guiding block 15. However, this implies that the jet of cooling liquid 14 has different orientations in the first and second positons of the guiding block 15. When the guiding block 15 is in its first position, as depicted in FIGS. 1 and 2, the jet of cooling liquid 14 is described by a first line. When the guiding block 15 is in its second position, as depicted in FIGS. 3 and 4, the jet of cooling liquid 14 is described by a second line. The first and second lines have different starting points depending on the position of the guiding block 15, but intersect on the side surfaces 9, 10 of the cutting insert 2 downstream from the respective outlets 19, 20 in the guiding block 15.

Figure 5:
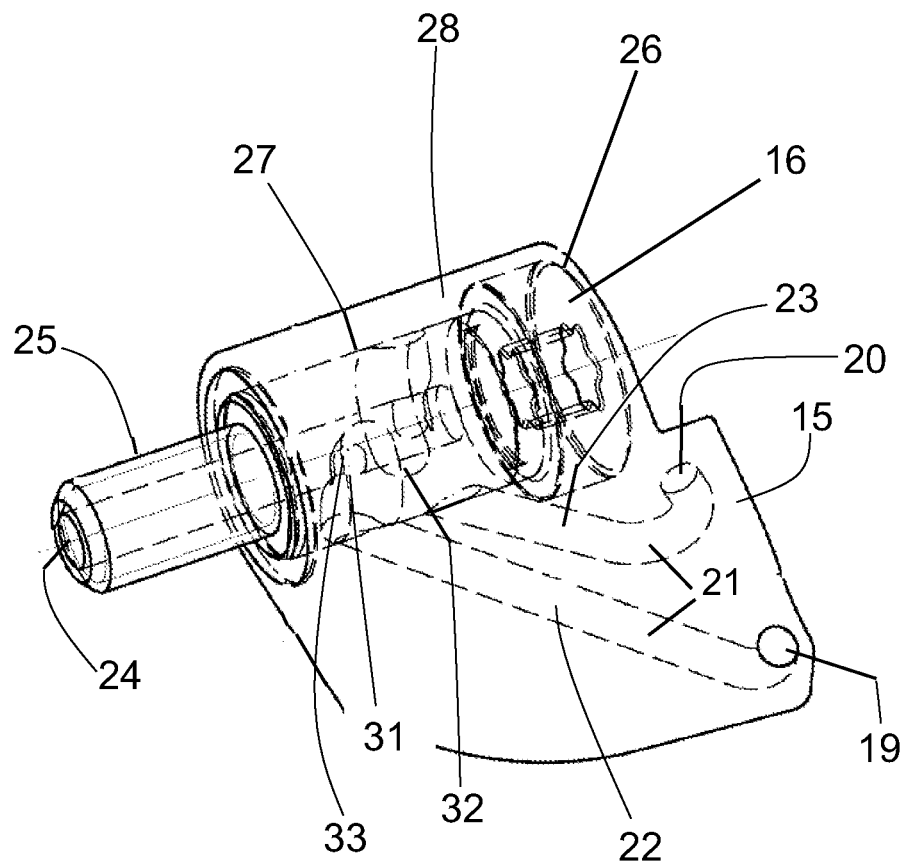
FIG. 5 is an isometric view of the guiding block and a transfer element of the turning tool of FIGS. 1 to 4 from a first perspective.
Figure 6:
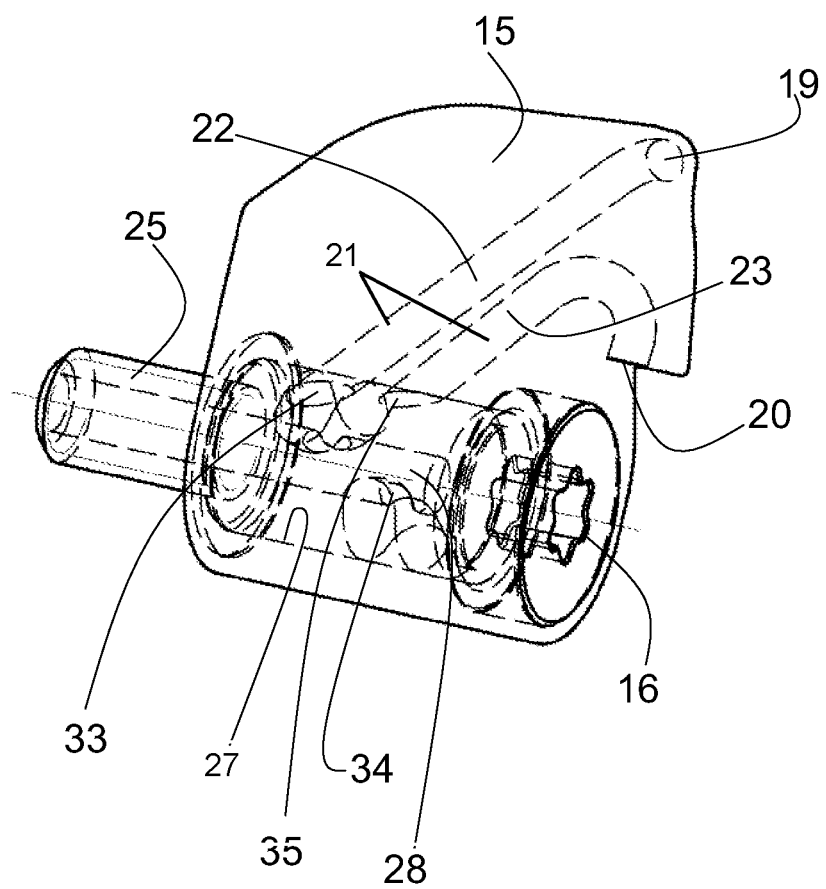
FIG. 6 is an isometric view of the guiding block and transfer element of FIG. 5 from a second perspective.

While FIGS. 1 to 4 provide an understanding of the general concept of the present disclosure, FIGS. 5 and 6 reveal the details of the design of the guiding block 15, in order to provide the optimized jet 14 of cooling liquid.

In the implementation depicted in FIGS. 1 to 6, the guiding block 15 carries two outlets, namely a first outlet 19 and a second outlet 20, which eject the jet 14 of cooling liquid in the first position and in the second position, respectively. The fluid passage 21 is formed by multiple sections, wherein a first section (not depicted in the figures) extends in the tool body 4 and wherein a second section 22 and a third section 23 extend in the guiding block 15.

The screw 16 forming the pivot axis for the guiding block 15, also forms the transfer element in the sense of the present disclosure. This transfer element 16 not only provides a transfer of the cooling liquid from the first section of the fluid passage in the tool body 4 to the second and third sections 22, 23 of the fluid passage, but also allows to switch the transfer alternately to either of the two sections 22, 23.

The transfer element 16 has a hollow cylindrical part, wherein the cooling liquid can flow through the duct 24 extending in an axial direction of the screw 16 in the element. The transfer element 16 is screwed with its rear end 25 into a hole in the tool body 4. The hole in the tool body 4 concentrically surrounds an end of the first section of the fluid passage in the tool body 4. Thus, the cooling liquid flowing through the first section of the fluid passage is then further guided by the axial fluid duct 24 in the transfer element.

The transfer element 16 further has a switching element 28 extending in a hole 26 in the guiding block 15. An inner cylindrical surface 27 of the hole 26 is in engagement with an outer cylindrical surface 29 of the switching element 28. During operation of the turning tool 1, the switching element 28 of the transfer element 16 is stationary with respect to the tool body 4. While pivoting the guiding block 15, the guiding block 15 not only pivots with respect to the tool body 4, but also with respect to the switching element 28 of the transfer element 16. The switching element 28 of the transfer element 16 has a radial fluid duct 30, 31 at two axial positions guiding the cooling fluid in a radial direction of the transfer element 28.

The first radial fluid duct 30 connects the axial fluid duct 24 at a first axial position to a first groove 32 in the surface 29 of the switching element 28. The first axial position of the first groove 32 is identical to the axial position of a rear end 33 of the second section 22 of the fluid passage. The first groove 32 extends in a circumferential direction in the cylindrical surface 29 of the switching element 28. However, the first groove 32 does not extend over 360° of the switching element 28, but only covers a certain angle. Consequently, a flow of cooling liquid from the inner axial fluid duct 24 through the first radial fluid duct 30 into the first groove 32 and further into the second section 22 of the fluid passage only occurs when the guiding block 15 is in the first position or close to the first position.

The same principle also applies with respect to the second axial position defined by the second radial fluid duct 31, which also ends in a second circumferentially extending groove 34 in the cylindrical surface 29 of the switching element 28. As the rear end 35 of the third section 23 of the fluid passage in the guiding block 15 is at the same axial position as the second groove 34, a flow of cooling liquid from the inner axial fluid duct 24 through the second radial fluid duct 31 and the 20) second groove 34 into the third section 23 of the fluid passage in the guiding block 15 only occurs when the guiding block 15 is in the second position.

By the design of the transfer element 16, as well as, the guiding block 15, a pivoting of the guiding block 15 around the transfer element 16 not only changes the position of the outlets 19, 20 of the second section 22 and third section 23 of the fluid passage, respectively, but also switches, such that cooling liquid in the first position of the guiding block 15, as it is depicted in FIGS. 1 and 2, is only ejected through the first outlet 19 in the guiding block 15, and such that when the guiding block is in its second position, as it is depicted in FIGS. 3 and 4, cooling liquid is only ejected from the second outlet 20.

Thus, the design as it is shown in the figures allows to change the direction of the jet 14 of cooling liquid, while still avoiding an unnecessary leakage of cooling liquid through the other outlet which is not in the correct position during operation.

From FIGS. 5 and 6 it is clearly derivable that the design and shape of the second section 22 and third section 23 of the cooling duct in the guiding block 15 has been chosen in order to provide an optimized direction of the jet 14 of cooling liquid in the first position of the guiding block 15, but also in the second position of the guiding block 15.

For the purposes of original disclosure, it is noted that all features become apparent for a person skilled in the art from the present description, the figures and the claims even if they have only been described with reference to particular further features and can be combined either on their own or in arbitrary combinations with other features or groups of features disclosed herein as far as such combinations are not explicitly excluded or technical facts exclude such combinations or make them useless. An extensive, explicit description of each possible combination of features has only been omitted in order to provide a short and readable description.

While the disclosure has been shown in detail in the figures and the above description, this description is only an example and is not considered to restrict the scope of protection as it is defined by the claims. The disclosure is not restricted to the disclosed embodiments.

Modifications to the disclosed embodiments are apparent for a person skilled in the art from the drawings, the description and the attached claims. In the claims, the word "comprising" does not exclude other elements or steps and the undefined article "a" does not exclude a plurality. The mere fact that some features have been claimed in different claims does not exclude their combination. Reference numbers in the claims are not considered to restrict the scope of protection.

The invention claimed is:

1. A turning tool comprising:
   a tool body having an insert seat with a bottom support surface;
   a cutting insert fastened to the insert seat, the cutting insert having a top surface and a bottom surface below, and opposite, the top surface, wherein a side surface connects the top surface and the bottom surface, and wherein a cutting edge is formed at an intersection between the side surface and the top surface, wherein the side surface forms a clearance surface associated with the cutting edge, the top surface forms a chip surface associated with the cutting edge, and the bottom surface is in engagement with the bottom support surface;
   a guiding block pivotally mounted on the tool body, the guiding block pivotally mounted about a pivot axis between a first position and a second position, wherein the pivot axis is located below the bottom surface of the insert seat; and
   a fluid passage with an inlet end and an outlet end, the outlet end includes a first outlet in the guiding block and a second outlet in the guiding block, the fluid passage is arranged to guide a cooling fluid from the inlet end to the outlet end,
   wherein a first section of the fluid passage extends through the tool body, wherein a second section of the fluid passage extends through the guiding block, and wherein a third section of the fluid passage extends through the guiding block,
   wherein each of the first and second outlets is arranged to eject a jet of the cooling fluid towards an area where the clearance surface is located in order to wet the clearance surface,
   wherein the guiding block is pivotal between a first position and a second position, in the first position, a first jet of cooling fluid is configured to be ejected along a first path from the first outlet, and the second outlet is inactive, and in the second position, a second jet of cooling fluid is configured to be ejected along a second path from the second outlet, and the first outlet is inactive, wherein the first path and the second path have different starting points and intersect each other in a respective downstream direction of each outlet, the starting point of each of the first path and the second path being below the insert seat, below being in a downward direction of the tool body extending into the tool body through the bottom surface and away from the top surface.

2. The turning tool according to claim 1, further comprising a transfer element arranged to transfer the cooling fluid from the first section of the fluid passage in the tool body to the second section of the fluid passage in the guiding block.

3. The turning tool according to claim 2, wherein the transfer element extends from an outer surface of the tool body into a hole in the guiding block, the transfer element including a cylindrical outer surface in engagement with an inner cylindrical surface of the hole in the guiding block, wherein the transfer element includes an inner axial fluid duct in fluid communication with the first section of the fluid passage, wherein the transfer element includes a circumferentially extending first groove in the cylindrical outer surface or wherein the guiding block includes a circumferentially extending first groove in the inner cylindrical surface, wherein the first groove is located at a first axial position.

4. The turning tool according to claim 3, wherein the second section of the fluid passage leads to the first outlet and the third section leads to the second outlet.

5. The turning tool according to claim 4, wherein the first outlet is located in a first outer surface section of the guiding block, and wherein the second outlet is located in a second outer surface section of the guiding block, wherein a direction of a surface normal of the first outer surface section is different from a direction of a surface normal of the second outer surface section.

6. The turning tool according to claim 4, wherein the transfer element is arranged to selectively transfer the cooling fluid either from the first section of the fluid passage in the tool body to the first outlet via the second section of the fluid passage in the guiding block or from the first section of the fluid passage in the tool body to the second outlet via the third section of the fluid passage in the guiding block.

7. The turning tool according to claim 6, wherein either the transfer element includes a circumferentially extending second groove in the cylindrical outer surface or the guiding block includes a circumferentially extending second groove in the inner cylindrical surface, wherein the second groove is located at a second axial position, wherein the transfer element includes a second radial fluid duct connecting the inner axial fluid duct and the second groove, and wherein the third section of the fluid passage in the guiding block that leads to the second outlet discharges into the cylindrical hole at the second axial position.

8. The turning tool according to claim 7, wherein the first groove and the second groove each have a circumferential extension of less than 360°, and wherein the first groove and the second groove are arranged such that at least when the guiding block is in the first position, the second section of the fluid passage that leads to the first outlet is in fluid communication with the first section of the fluid passage and the third section of the fluid passage that leads to the second outlet is not in fluid communication with the first section of the fluid passage and such when the guiding block is in the second position, the third section of the fluid passage that leads to the second outlet is in fluid communication with the first section of the fluid passage and the second section of the fluid passage that leads to the first outlet is not in fluid communication with the first section of the fluid passage.

9. The turning tool according to claim 1, wherein in the first position of the guiding block an abutment surface of the guiding block is in engagement with a first stop surface of the tool body, and wherein in the second position of the guiding block another abutment surface of the guiding block is in engagement with a second stop surface of the tool body.

10. The turning tool according to claim 1, wherein the turning tool, in addition to the fluid passage for cooling the clearance surface, includes a cooling duct for ejection of the cooling fluid onto the chip surface.

11. The turning tool according to claim 1, further comprising a mounting means, wherein cutting insert is fastened in the insert seat by the mounting means.

12. The turning tool according to claim 1, wherein the turning tool is located in an imaginary circle having a diameter equal to a minimum diameter of an inner surface turnable by the turning tool, wherein the circle is in engagement with the cutting edge, and wherein in the first position the guiding block protrudes beyond the circle and in the second position the guiding block is distanced from the circle without intersecting the circle.

13. The turning tool according to claim 1, wherein the first path and the second path intersect each other at a position on the clearance surface.

14. The turning tool of claim 3, wherein the transfer element includes a first radial fluid duct connecting the inner axial fluid duct and the first groove.

15. The turning tool of claim 3, wherein the second section of the fluid passage in the guiding block discharges into the cylindrical hole at the first axial position.

* * * * *